Patented Oct. 23, 1945

2,387,514

UNITED STATES PATENT OFFICE 2,387,514

METHOD OF MAKING CELLULAR ASPHALTIC INSULATION MATERIAL

August Holmes, Cranford, N. J., assignor, by mesne assignments, to Standard Catalytic Company, a corporation of Delaware No Drawing. Application May 9, 1941,
Serial No. 392,822

11 Claims. (Cl. 106—122)

This invention relates to the manufacture of cellular asphaltic material suitable for heat insulation and sound deadening purposes.

Asphaltic materials have been used for heat insulation and for soundproofing purposes but the use heretofore has been greatly limited due to the relatively high heat conductivity as compared to other insulating materials, to the weight of the asphaltic material and also because of the flowing tendencies of asphaltic materials at moderate temperatures, especially when applied to vertical constructions. The asphaltic material generally as a solid mass, had been used for either heat insulation or sound deadening purposes and it is obvious that it necessarily required quite a substantial support to keep it in position.

It is an object of this invention to provide a heat insulating and sound deadening asphaltic material that will be relatively light in weight and also have improved heat insulating and sound-proofing properties.

According to this invention, hard asphalt in powdered form and a solid material capable of giving off gaseous products at or moderately below the sintering temperature of the asphalt was intimately mixed together. The mixture was then placed in a mould and the temperature raised sufficiently to fuse or sinter the mass while at the same time a simultaneous decomposition of the gas-evolving solid was obtained so that as the fused mass cooled, a porous cellular structure was obtained. The temperature of heating the asphaltic material was preferably that at which incipient carbonization of the asphalt occurs. This may be modified or lowered somewhat by the selection of admixed solid material or by the addition of a special carbonization promoter to react with the asphalt.

The powdered hard asphalt that was used in the preparation of the insulating material was produced by simple distillation, oxidation, or both, of asphaltic residues from crude oils, residual oils from petroleum cracking and refining, acid sludges, solvent refining operations, etc.

Asphalt in mass has a heat conductivity of around 1.2 B. T. U. per hour per square foot for temperature gradient of 1° F. per inch thickness and so may be considered as being only moderately effective as a heat insulating material as compared to around 0.3 to 0.4 B. T. U. for the more effective materials. It is well known that among other things, the heat conductivity of a material is related to its porosity, the more porous it is or the lower its bulk density, the poorer it becomes as a conductor of heat, which is more commonly described as becoming a better heat insulator. The sound deadening efficacy proceeds in an analogous manner. It is realized that increasing the porosity of asphalts has been attempted by heating asphalts admixed with gas giving material to above the decomposition point of the added material. Such composition, however, lacks permanence due to the low consistency of the asphalt for which deficiency fillers are added with a consequent increase in weight and only a minor reduction in flow properties.

In order to produce stable structures, the present invention employs asphalts having relatively high softening point, 175° F. and above, with best results being obtained when the softening point of the asphalt is greater than 275° F. The temperatures required however for liquefying the high softening asphalts often prevent the introduction of the gas-evolving materials without their decomposition. This invention permits the intimate mixture of the asphalt and the gas-evolving materials by first comminuting the asphalt into a fine powder before admixing the gas-evolving material. The leavening agents suitable for this process are ammonium carbonate, ammonium carbamate, oxalic acid, ammonium formate, ammonium chloride, urea, ferric sulfate crystals, solid salts with high water of crystallization, etc.

The intimate mixture of powdered asphalt and gas-evolving agent is placed into a mould and heated to a minimum temperature at which incipient sintering or fusion of the mass occurs, but in any case this temperature must be great enough to cause a simultaneous decomposition of the leavening agent so as to produce a cellular structure in the finished product. For best results, however, the temperature should be such as to bring about incipient carbonization of the asphalt, namely 725° F. to 800° F. or above.

This incipient carbonization temperature can be reduced, which is a further object of this invention, by the addition of carbonization promoters such as acid sludge from petroleum refining sulfuric acid of suitable concentration, solid oxidizing agents, such as permanganates, dichromates, etc. The addition of these carbonization promoters reduces the incipient carbonization temperature to around 530° F. to 550° F.

By following the preferred procedure using oxalic acid as the leavening agent and concentrated sulfuric acid as the carbonization promoter, and heating the powdered asphalt mixtures in a mould at 575° F., a cellular, carbonized asphalt block was obtained which had the following properties:

Weight per cubic foot_____pounds__ 8.95
Heat conductivity B. t. u./hr./sq. ft. for temperature gradient of 1° F./inch thickness__ 0.38
Compressive strength_____lbs./sq. in__ 265
Water absorption after 100 hrs. soaking
            per cent__ 5.3
Solubility in carbon disulfide_____do____ 25.8

Alternatively, a mixture of finely powdered hard asphalt and a softer asphalt to serve as a binder to form a dough-like mixture may be used, that is this mixture, together with a leavening agent, was placed in a mould and heated to obtain a cellular carbonized asphalt block of the desired physical characteristics.

Hard asphalt granulated in various size particles and graded into large intermediate and fines in suitable proportions to fill voids in a similar manner to that used in the preparation of concrete where stone, gravel and sand are used, was placed in a mould and heated sufficiently to form a carbonized asphalt block.

I claim:

1. The method of preparing cellular asphaltic insulation material which comprises mixing powdered hard asphalt with a leavening agent comprising ammonium carbonate, molding the mixture and subjecting the molded mixture to a temperature at approximately the charring temperature.

2. The method of preparing cellular asphaltic insulation material which comprises mixing powdered hard asphalt with a leavening agent comprising ammonium carbamate, molding the mixture and subjecting the molded mixture to a temperature at approximately the charring temperature above 725° F.

3. The method of preparing cellular asphaltic insulation material which comprises mixing powdered hard asphalt with a leavening agent comprising ammonium chloride, molding the mixture and subjecting the molded mixture to a temperature at approximately the charring temperature.

4. The method of preparing cellular asphaltic insulation material which comprises mixing powdered hard asphalt with a leavening agent comprising ammonium carbonate, molding the mixture and subjecting the molded mixture to a temperature at approximately the charring temperature, thereby converting a portion of the asphalt into a carbonaceous solid skeleton.

5. The method of preparing solid cellular asphaltic insulation material, which comprises mixing together powdered hard asphalt, a leavening agent comprising ammonium carbonate, a petroleum sulfuric acid sludge, molding the mixture and subjecting the molded mixture to a temperature above the carbonization temperature.

6. The method of preparing solid cellular asphaltic insulation material, which comprises mixing together powdered hard asphalt, a leavening agent comprising ammonium carbonate, a petroleum sulfuric acid sludge, molding the mixture and subjecting the molded mixture to a temperature above the carbonization temperature above about 530° F.

7. The method of preparing cellular asphaltic insulation material which comprises mixing powdered hard asphalt with an ammonia salt selected from the group consisting of ammonium carbonate, ammonium carbamate and ammonium chloride, molding the mixture and subjecting the mixture to a temperature approximately at the charring temperature of the asphalt.

8. The method of preparing cellular asphaltic insulation material which comprises mixing powdered hard asphalt having a softening point of at least 275° F. with an ammonia salt selected from the group consisting of ammonium carbonate, ammonium carbamate and ammonium chloride, molding the mixture and heating the mixture to approximately the charring temperature.

9. The method of preparing cellular asphaltic insulation material which comprises mixing powdered hard asphalt having a softening point of at least 275° F. with an ammonia salt selected from the group consisting of ammonium carbonate, ammonium carbamate and ammonium chloride, molding the mixture and subjecting the mixture to a temperature of at least 725° F.

10. The method of preparing cellular asphaltic insulation material which comprises mixing a powdered hard asphalt having a softening point of at least 275° F. with an ammonia salt selected from the group consisting of ammonium carbonate, ammonium carbamate and ammonium chloride and a petroleum sulfuric acid sludge, molding the mixture and subjecting to a temperature of about 530° to 550° F.

11. The method of preparing cellular asphaltic insulation material which comprises mixing a powdered hard asphalt and a softer asphalt with an ammonia salt selected from the group consisting of ammonium carbonate, ammonium carbamate and ammonium chloride and a petroleum sulfuric acid sludge, molding the mixture and subjecting to a temperature of about 530° to 550° F.

AUGUST HOLMES.